E. H. McALEER.
ANIMAL TRAP.
APPLICATION FILED JAN. 19, 1909.
956,138.
Patented Apr. 26, 1910.
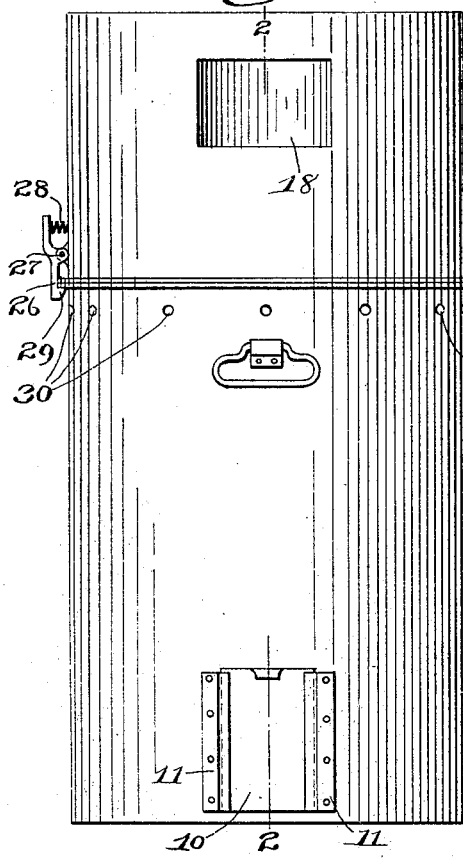
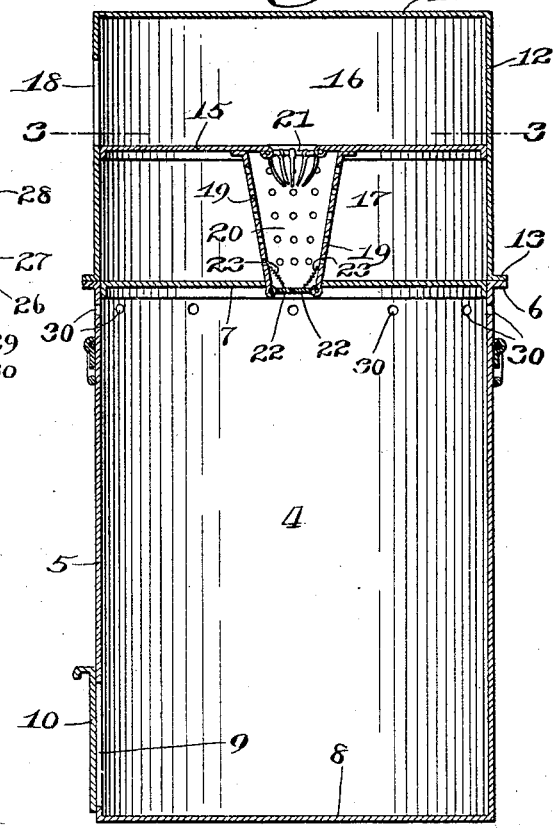
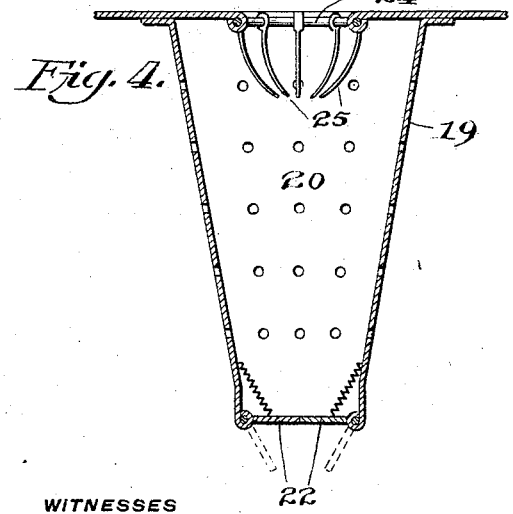
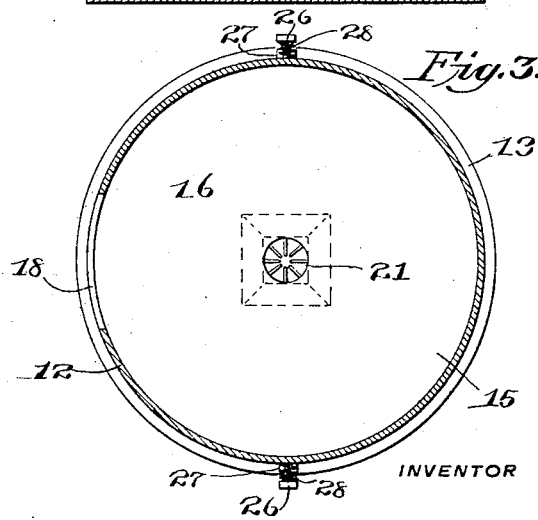
WITNESSES
INVENTOR
Edward H. McAleer
BY
A. V. Grant
ATTORNEY

UNITED STATES PATENT OFFICE.

EDWARD H. McALEER, OF PHILADELPHIA, PENNSYLVANIA.

ANIMAL-TRAP.

956,138.  Specification of Letters Patent.  Patented Apr. 26, 1910.

Application filed January 19, 1909.  Serial No. 473,121.

*To all whom it may concern:*

Be it known that I, EDWARD H. MCALEER, citizen of the United States, and resident of the city and county of Philadelphia, State of Pennsylvania, have invented certain new and useful Improvements in Animal-Traps, of which the following is a full, clear, and exact description.

This invention relates to animal traps, and especially to traps adapted to catch rats and similar animals.

The object of the invention is to provide a simple, inexpensive and efficient trap having provision whereby the animals may be induced to enter the trap and be confined therein, as will be hereinafter fully described and particularly claimed.

In the drawings:—Figure 1 is an elevation of my improved trap. Fig. 2 is a vertical section thereof, as on the line 2—2 of Fig. 1. Fig. 3 is a horizontal section as on the line 3—3 of Fig. 2. Fig. 4 is an enlarged vertical section of the walls forming the passageway leading to the cage and adjuncts.

4 designates a cage adapted to receive and confine the animals therein. This cage 4 comprises a vertically-arranged cylinder 5 having a flange 6 projecting outwardly from the upper edge thereof, a top 7 secured to the upper end of the cylinder 5 and a bottom 8 formed on or secured to the bottom of the cylinder 5.

The lower portion of the cylinder 5 is provided with an opening 9 therein through which the animals may be removed from the cage 4. This opening 9 is closed by a vertically slidable door 10, the lateral edges of which are held against the outer face of the cylinder 5 by suitable vertically-arranged guide-plates 11, which hold the door 10 in place and permit it to be moved vertically to open and close the opening 9.

Mounted on the cage 4 is an upper structure comprising a cylinder 12 having an outwardly-extending flange 13 on the lower end thereof which rests upon the flange 6 of the cage or lower cylinder 5; a top 14 formed on or secured to the upper end of the cylinder 12; and a horizontal partition 15 extending through the cylinder 12 and secured thereto between the upper and lower ends thereof. This upper structure incloses an entrance chamber 16 above the partition 15 and a bait chamber 17 below the partition 15, the bottom of the bait chamber 17 being formed by the top 7 of the cage 4.

The cylinder 12 is provided with a suitable door or opening 18 through which the animals may pass into the chamber 16.

Extending vertically through the bait chamber 17 are perforated walls 19 forming a passageway 20 which extends through the bait chamber 17 and is adapted to afford communication between the entrance chamber 16 and the cage 4. The upper ends of the walls 19 are secured to the partition 15, which is provided with an opening 21 therein forming a continuation of the passageway 20. The lower ends of the walls 19 extend through an opening in the top 7 of the cage 4, whereby, when the upper structure is removed from the cage 4, the lower ends of the walls 19 may be withdrawn from the opening in the top 7 of the cage. The lower end of the passageway 20 is closed by a pair of inwardly-extending doors 22, which close against walls 19 of the passageway 20, the outer edges of said doors being hinged to opposite walls of the passageway. The doors 22 are maintained normally closed by the action of springs 23 the upper ends of which are attached to the walls 19 and the lower ends of which are attached to the doors 22. It will thus be seen that an animal, in passing downwardly through the passageway 20, may open the doors 22 to permit the animal to enter the cage 4; and that, after the animal has entered the cage 4, the doors 22 will be closed by the springs 23, thus preventing the animal from leaving the cage through the passageway 20.

Extending around the opening 21 in the partition 15, is a wire 24 which is supported by said partition; and secured to the wire 24 by supporting or other means are the upper ends of spring wires 25 which are arranged within the upper portion of the passageway 20. The wires 25 are curved as shown, and they extend downwardly and inwardly from the wire 24. It will thus be seen that an animal may enter the upper portion of the passageway 20 from the entrance chamber 16 by pressing outwardly the free ends of the wires 25, which wires are sufficiently flexible to permit them to yield very readily. It will also be seen that should the animal attempt to pass upwardly through the wires 25, the free ends of the wires 25 will be forced toward each other by the body of the animal, and thus prevent the animal from moving upwardly through the passageway 20 after it has passed the lower ends of the wires 25 or while it is passing through the lower ends of the wires 25.

The upper structure inclosing the entrance chamber 16 and bait chamber 17 is detachably secured to the cage 4 by suitable latch levers 26 which are pivoted, as at 27, to suitable brackets on the upper structure or cylinder 12. The upper end of each lever 26 is pressed outwardly by a spring 28, and the lower end of each lever 26 is beveled, as shown, and provided with a latch 29 which is adapted to engage the bottom of the flange 6 of the cage 4 and lock the upper structure and cage together.

By pressing inwardly the upper ends of the latch levers 26 against the action of the spring 28, the latches 29 of the lower ends of the levers 26 may be disengaged from the flange 6 to permit the removal of the upper structure from the cage.

In applying the upper structure to the cage, the downward movement of the cylinder 12 toward the cage 4 will cause the lower, beveled ends of the levers 26 to engage the flange 6 and move outwardly until the latches 29 come below the flange 6; whereupon, the springs 28 will project the upper ends of the levers 26 outwardly and cause the latches 29 to pass under the flange 6 and lock the cylinder 12 to the cylinder 5.

By removing the cylinder 12 from the cage, suitable bait may be readily applied to the bait chamber 17. After the bait chamber has been supplied with bait, the animals, in seeking the bait, will enter the entrance chamber 16 through the opening 18, and be attracted to the passageway 20 by the odor of the bait passing through the perforated walls 19. The odor from the bait coming through the passageway 20 will cause the animals to seek the bait by passing downwardly through the passageway and into the cage 4, the wires 25 and doors 22 permitting the animals to pass downwardly through the passageway 20, as previously explained, and the doors 22 confining the animals within the cage 4 after they have entered the same.

The upper portion of the cage or cylinder 5 is provided with small openings 30 therein for ventilation.

I claim:—

1. In an animal trap, the combination of a lower animal-receiving cage, an upper structure inclosing a bait chamber above the cage and an entrance chamber above the bait chamber, perforated walls forming an animal-passageway open at its upper end and leading through the bait chamber and communicating with the cage, downwardly and inwardly extending spring fingers within the upper portion of said passageway, a door extending into the lower portion of said passageway and arranged to open downwardly, and yielding means for maintaining said door normally closed.

2. In an animal trap, the combination of a lower animal-receiving cage having a top wall, an upper structure removably mounted on the cage and inclosing a bait chamber having a bottom open when the upper structure is removed from the cage, and closed by the top wall of the cage when the upper structure is applied thereto, perforated walls forming an animal passageway open at its upper end and leading through the bait chamber and communicating with the cage, and means for detachably securing the cage and the upper structure together.

3. In an animal trap, the combination of a lower animal-receiving cage having a top wall provided with an opening therein, an upper structure removably mounted on the cage and inclosing a bait chamber having a bottom open when the upper structure is removed from the cage and closed by the top wall of the cage when the upper structure is applied thereto, perforated walls carried by the upper structure and extending through the bait chamber and into the opening in the top wall thereof and forming an animal passageway open at its upper end and communicating with the cage, and means for detachably securing the cage and the upper structure together.

4. In an animal trap, the combination of a lower animal-receiving cage provided with a flange, an upper structure removably mounted on the cage and inclosing a bait chamber, perforated walls forming an animal-passageway open at its upper end and leading through the bait chamber and communicating with the cage, and spring-pressed catch devices engaging said flange detachably securing the cage and upper structure together.

In testimony whereof, I have hereunto affixed my signature.

EDWARD H. McALEER.

Witnesses:
 WM. HARRISON SMITH,
 A. V. GROUPE.